(12) United States Patent
Rubanovich et al.

(10) Patent No.: US 8,489,643 B1
(45) Date of Patent: Jul. 16, 2013

(54) SYSTEM AND METHOD FOR AUTOMATED CONTENT AGGREGATION USING KNOWLEDGE BASE CONSTRUCTION

(75) Inventors: Michael Rubanovich, Haifa (IL); Dmitry Babitsky, Haifa (IL)

(73) Assignee: ForNova Ltd., Yoqneam Ilit (IL)

( * ) Notice: Subject to any disclaimer, the term of this patent is extended or adjusted under 35 U.S.C. 154(b) by 0 days.

(21) Appl. No.: 13/357,680

(22) Filed: Jan. 25, 2012

Related U.S. Application Data

(60) Provisional application No. 61/436,597, filed on Jan. 26, 2011.

(51) Int. Cl.
*G06F 17/30* (2006.01)

(52) U.S. Cl.
USPC .......................................................... 707/794

(58) Field of Classification Search
USPC ................. 707/755, 794, 707, 705, 706, 804, 707/759
See application file for complete search history.

(56) References Cited

U.S. PATENT DOCUMENTS

| | | | | |
|---|---|---|---|---|
| 7,240,067 B2* | 7/2007 | Timmons | ............................. | 1/1 |
| 7,246,306 B2* | 7/2007 | Chen et al. | ................... | 715/205 |
| 7,739,258 B1* | 6/2010 | Halevy et al. | ................ | 707/706 |
| 8,060,518 B2* | 11/2011 | Timmons | ..................... | 707/755 |
| 8,065,286 B2* | 11/2011 | Jones | ........................... | 707/706 |
| 2002/0065857 A1* | 5/2002 | Michalewicz et al. | ........ | 707/532 |
| 2004/0199497 A1* | 10/2004 | Timmons | ......................... | 707/3 |
| 2007/0078814 A1* | 4/2007 | Flowers et al. | .................... | 707/2 |
| 2007/0174244 A1* | 7/2007 | Jones | ............................... | 707/3 |
| 2007/0208732 A1* | 9/2007 | Flowers et al. | .................... | 707/5 |
| 2009/0024574 A1* | 1/2009 | Timmons | ......................... | 707/3 |
| 2009/0077180 A1* | 3/2009 | Flowers et al. | .............. | 709/206 |
| 2010/0169352 A1* | 7/2010 | Flowers et al. | .............. | 707/759 |

FOREIGN PATENT DOCUMENTS

| | | | |
|---|---|---|---|
| EP | 2225676 A2 * | 9/2010 | |
| EP | 2504779 A2 * | 10/2012 | |

* cited by examiner

*Primary Examiner* — Jean M Corrielus

(74) *Attorney, Agent, or Firm* — Graeser Associates International Inc; Dvorah Graeser

(57) ABSTRACT

A method for enabling automated content aggregation based on deep Web sources, comprising: analyzing a plurality of deep web sources to detect a plurality of fields; selecting at least one field; and aggregating content provided to a plurality of deep web sources through said at least one field.

11 Claims, 4 Drawing Sheets

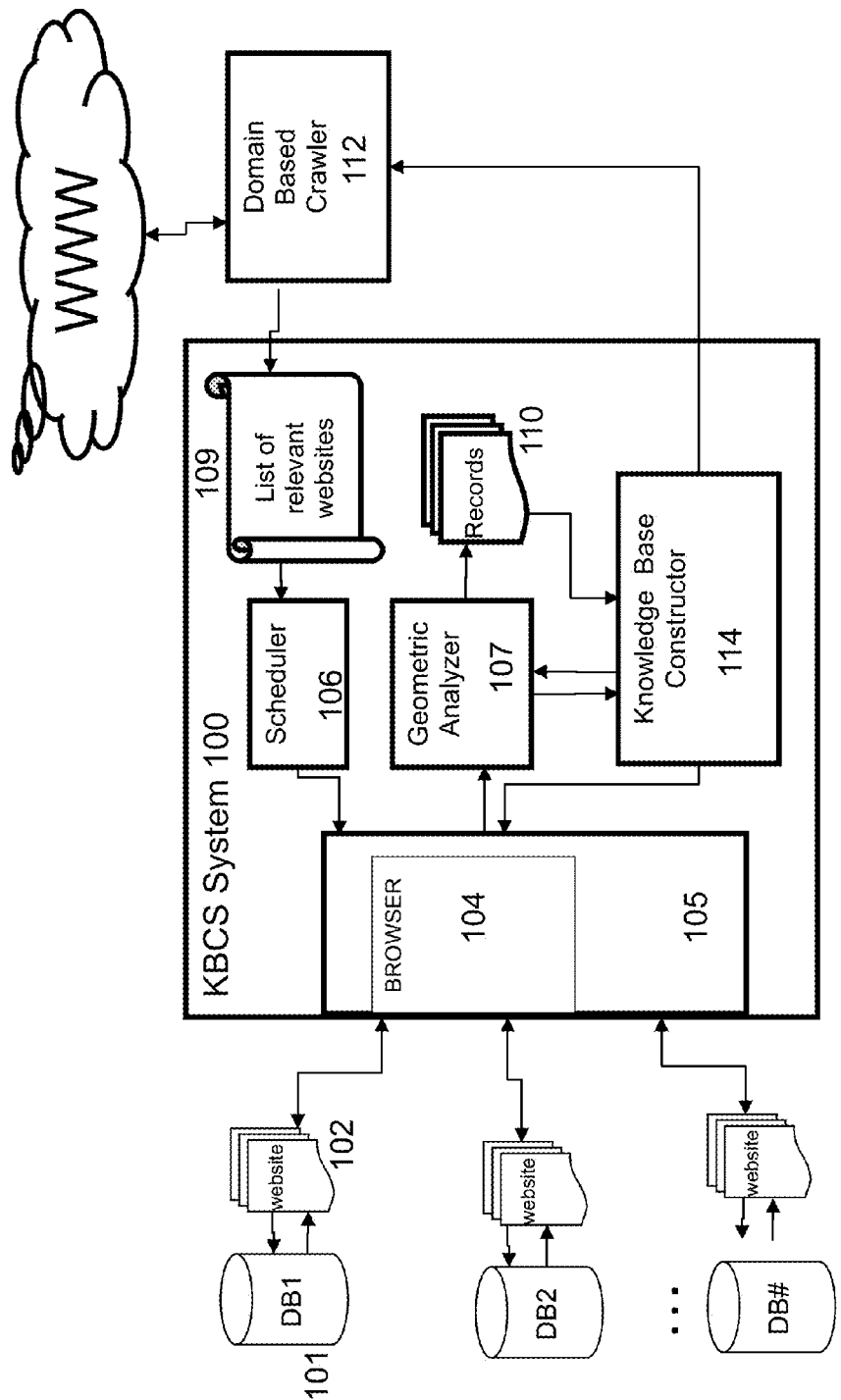

SYSTEM AND METHOD FOR AUTOMATED CONTENT AGGREGATION USING KNOWLEDGE BASE CONSTRUCTION

This Application claims priority from U.S. Provisional Application No. 61/436,597, filed on 26 Jan. 2011, which is hereby incorporated by reference as if fully set forth herein.

FIELD OF THE INVENTION

The present invention relates to systems and methods useful in developing knowledge bases. Specifically, embodiments of the present invention relate to automated knowledge base configuration and development.

BACKGROUND OF THE INVENTION

The Deep Web is the part of the Internet that is inaccessible to conventional search engines, and consequently, to most users. Deep Web content includes information in private databases that are indirectly accessible over the Internet but not crawlable by typical search engines. For example, libraries maintain data bases of books that are accessible to the public but in order to access them a user needs to fill out a web form in order to access the content.

In general, it is assumed that deep Web was growing much more quickly than the surface Web and that the quality of the content within it was significantly higher than the vast majority of surface Web content. Although most of this content is publicly available, it's accessibility to typical Internet end users is very limited.

It would be highly advantageous to have a platform that would enable end users to effectively configure and access surface web and deep web data sources remotely.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing certain selected tasks or stages manually, automatically, or a combination thereof. Moreover, according to actual instrumentation and equipment of preferred embodiments of the method and system of the present invention, several selected stages could be implemented by hardware or by software on any operating system of any firmware or a combination thereof. For example, as hardware, selected stages of the invention could be implemented as a chip or a circuit. As software, selected stages of the invention could be implemented as a plurality of software instructions being executed by a computer using any suitable operating system. In any case, selected stages of the method and system of the invention could be described as being performed by a data processor, such as a computing platform for executing a plurality of instructions.

Although the present invention is described with regard to a "computer" on a "computer network", it should be noted that optionally any device featuring a data processor and/or the ability to execute one or more instructions may be described as a computer, including but not limited to a PC (personal computer), a server, a minicomputer. Any two or more of such devices in communication with each other, and/or any computer in communication with any other computer may optionally comprise a "computer network".

The present invention relates at least partly to a method for enabling automated content aggregation based on deep Web sources, comprising: analyzing a plurality of deep web sources to detect a plurality of fields; selecting at least one field; and aggregating content provided to a plurality of deep web sources through the at least one field. The present invention also relates at least partly to a method for automatically generating domain based knowledge bases based on deep Web sources, comprising: selecting a plurality of deep web sources according to a domain; analyzing the plurality of deep web sources to detect a plurality of fields; selecting at least one field at least partially according to the domain; and aggregating content provided to a plurality of deep web sources through the at least one field.

BRIEF DESCRIPTION OF THE DRAWINGS

The principles and operation of the system, apparatus, and method according to the present invention may be better understood with reference to the drawings, and the following description, it being understood that these drawings are given for illustrative purposes only and are not meant to be limiting, wherein:

FIG. 1A is a system diagram describing a system enabled to execute automated knowledge base construction of deep web data sources, according to some embodiments;

Figure 1B:
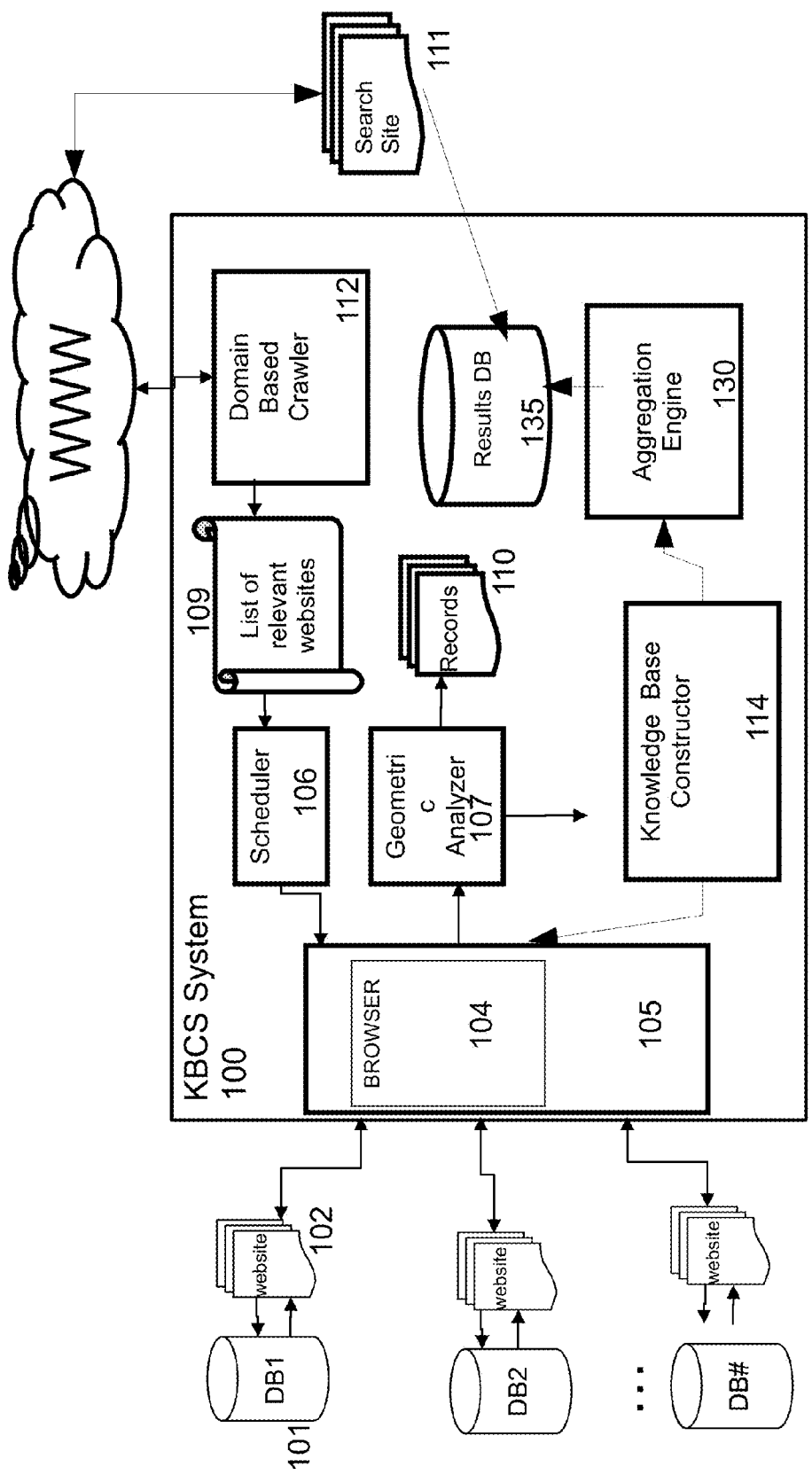
FIG. 1B is a system diagram describing a system enabled to aggregate search results from deep web data sources, using a domain based knowledge base, according to some embodiments.

It will be appreciated that for simplicity and clarity of illustration, elements shown in the drawings have not necessarily been drawn to scale. For example, the dimensions of some of the elements may be exaggerated relative to other elements for clarity. Further, where considered appropriate, reference numerals may be repeated among the drawings to indicate corresponding or analogous elements throughout the serial views.

DETAILED DESCRIPTION OF THE INVENTION

The following description is presented to enable one of ordinary skill in the art to make and use the invention as provided in the context of a particular application and its requirements. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In other instances, well-known methods, procedures, and components have not been described in detail so as not to obscure the present invention.

The term "deep web" as used herein may encompass the Deepnet, the invisible Web, the dark Web, the hidden Web or other terms representing data sources that are not typically indexed by the standard search engines. The term "surface web" as used herein may encompass the visible Web or indexable Web, or other parts of the World Wide Web that is indexed by conventional search engines.

Non-limiting embodiments of the present invention enable automated knowledge base construction for extracting information from deep web resources, according to some embodiments. In some embodiments, the system may be used to automatically build domain specific knowledge bases substantially without prior knowledge of fields or values associated with the domain knowledge bases being built. Further, in some embodiments, the system may be used to automatically create a unified, normalized Database of deep web content from multiple data sources, whether the sources are surface or deep. In additional embodiments the system may be used to facilitate automated user designed field searches.

Reference is now made to FIG. 1A which is a system diagram describing a system enabled to execute automated knowledge base construction of deep web resources, according to some embodiments. As can be seen in FIG. 1A, Knowledge Base Construction System (KBCS) 100 may be in communication with external databases 101, which are optionally deep web databases, accessible through web site interfaces 102, or other suitable interfaces, in order to fetch data from related sites. KBCS 100 may feature a Deep Web crawler 105 for crawling Websites internally for content and forms (or other entry points) to access data content relating to a search request.

Deep Web crawler 105 retrieves information as described for example in U.S. patent application Ser. No. 12/567,773, filed on 27 Sep. 2009, owned in common with the instant application and hereby incorporated by reference as if fully set forth herein. queries related sites and analyzes the result retrieved from each site. Such results can be retrieved from HTML/XML pages or from any other text format pages. According to this embodiment, a web browser 104 optionally applies its rendering composer engine on the HTML document to determine one or more geometrical properties of the document, for example optionally by generating a Document Object Model (DOM) tree, wherein each mark-up language tag (such as each HTML or XML tag) is associated with a node in the DOM-tree. For each node in the tree, the browser 104 also associates its geometrical representation for rendering the corresponding web page. The geometric representation is denoted, for example, by the XY origin offset, width, height and the like. The geometrical properties of such a tree are preferably analyzed to determine the layout of the document. Information is preferably then retrieved from the document according to the document layout. Optionally, semantic analysis is also applied as described in greater detail below.

In some embodiments Website lists may be generated by domain based crawler 112, an operator, machine or any combination. Sites list 109 can optionally reside in a file or alternatively be collected by domain based crawlers 112, for example, a specialized crawler that collects sites relevant for a certain domain (ie—for a certain area of knowledge or of interest, which searches for web sites having specific content). For example, domain based crawler 112 may optionally be provided with a list of content terms or with a collection of relevant web sites, and then searches for relevant web sites according to the terms and/or other information in the provided relevant web sites. Deep Web crawler 105 may use Website lists 109, generated by Domain Based Crawler 112 which is configured to run code to search for Websites relevant to a search request or field, to populate Websites list 109.

It is noted that the Deep Web crawler 105 may, if and when needed, execute automated web-form filling. For example, Deep Web crawler 105 may use the knowledge base Constructor 114 (described in greater detail below) to generate relevant queries in order to fill out the relevant web-forms in order to access selected data sources. Knowledge base constructor 114 receives the decomposed web page, which is decomposed by analyzing the page with the geometrical analyzer, which determines the record listings, without content analysis. Knowledge base constructor 114 analyzes the content in order to search for repeating terms and hence for repeating fields. The field may optionally be determined only according to location or only according to semantic analysis (such as a specific term or terms), but is preferably determined according to a combination of such parameters.

Knowledge base constructor 114 repeats this process for a plurality of web sites, and then cross-analyzes the fields and content for the plurality of web sites, for example to determine equivalent terms (such as for example "make" vs. "manufacturer"). Preferably fields of importance are determined according to statistical analysis of equivalent terms, such that the most frequently appearing fields are considered to be important. Knowledge base constructor 114 also preferably eliminates fields as being less important by detecting fields that do not appear in many web sites by statistical analysis. Preferably only the most important terms, according to statistical weighting, are then retained by knowledge base constructor 114.

Knowledge base constructor 114 is preferably first trained on highly structured web sites, for which the geometric analyzer 107 is able to more easily decompose the web sites into a plurality of fields. However, once knowledge base constructor 114 has been trained on some minimum number of web sites (which may for example optionally be set by an administrator user), then knowledge base constructor 114 is more easily able to analyze less structured web sites.

KBCS 100 may feature a Scheduler 106, which may run a program to control or manage the instructions to Deep Web crawler 105. For example, scheduler 106 may schedule the crawler 105 to automatically query the data bases 101 via the web sites interfaces 102 in order to retrieve relevant or updated data. In one example, such data being searched may be art gallery events, where a user wants to learn about upcoming art exhibitions in the world or in a region. In such as example, the KBCS System 100 will search and aggregate requested data from multiple art sites in accordance to the definitions of the search request entered.

System 100 may include a visual or Geometric analysis module 107, for using geometrical analysis of Web forms, tables, listings, text and other formats. In one example, a geometrical analysis tool such as that taught in the previously described U.S. patent application Ser. No. 12/567,773. Geometrical analyzer 107 typically receives the rendered pages from crawler 105, including the DOM-tree along with page geometric representation. The geometrical analyzer 107 analyzes the regularities on a selected web page layout and decomposes the web page into records 110 representing reoccurring sequences (patterns). In some embodiments, the geometrical analyzer finds regularities in the layout of web pages and creates a pattern for each such reoccurring (regular) sequence.

System 100 further includes a Knowledge Base Constructor module 114, which is an active module configured to run code or programs to communicate with geometrical analyzer 107 to receive at least the geometrically decomposed pages. In some examples the geometric analyzer 107 may execute code to decompose a webpage into records, from which patterns may be identified. Such patterns may initially be identified within a single webpage, yet once found, these patterns may be matched with other pages of the website. Optionally, a semantic module (not shown) may further analyze the text within the matched pattern. The knowledge base creator 114 may also be in communication with Deep web crawler 105. In some embodiments, Deep Web crawler 105 may execute instructions to search for a link to the next results page preferably only if the page has been identified as a relevant results page. Knowledge base Constructor 114 may run code to identify the fields that comprise records of the Deep Web source sites, and may execute a program to create a knowledge base, based on the description above, and the workflow described below with reference to FIG. 2.

Constructor 114 may, for example, utilize records generated by Geometric Analyzer 107 and compare/process and compile meaningful records, for example, the analysis may be done, for example, by comparing the different records of each site to each other and analyzing repetitive and non repetitive parts of the records. The knowledge base creator 114 may use records data 110, and optionally communicate with deep web crawler 105, to integrate data based on previous queries from records 110, and to optionally generate new queries in addition deep web sites. The knowledge base is a database that may contain semantic information relevant to one or more selected domains, such as field names, potential values, recognition rules and more.

According to some embodiments, Knowledge base creation module 114 may be used to analyze the text in the patterns recognized by the visual analysis, to identify structures that may be used for automated formation of fields and values relating to specific data fields. For example, Knowledge base construction module 114 may run an analysis on the records of art galleries, and identify common fields such as dates, addresses, artists etc. that are in common in multiple sites. Initially such an analysis may be run on a single site, and subsequently it may be run on multiple other sites, using cross referencing by analyzing field names/field values similarity. In this way, KBCS system 100 is able to use automated analysis of geometric + semantic results to provide dynamic, growing and learning databases and lists of field and value specific content from deep web and surface web data sources.

In some embodiments there may be no need for the list of websites to scan 109 and/or the scheduler 106, since the Knowledge base creation module 114 may facilitate substantially real time configuration and searching of selected queries by an end user.

In some embodiments, in a second phase, as can be seen with reference to FIG. 1B, the KBCS system may execute an Aggregation Engine or Module 130 to help automatically construct a search results database 135. Aggregation module 130 receives records from knowledge base creator module 114 and then constructs a database of aggregated results from all examined relevant web sites. The results of the analysis may comprise, for example, records, data and links to the relevant web pages, which may be stored in search results data base 135.

When a user queries for information, such as, for example a list of all higher education programs in the user's area, using for example a search engine 111, the information is retrieved from the results data base 135. Optionally an automated user may request the information, such as an automated feed provider. The information delivered to the requesting entity preferably comprises data and links to relevant sites for retrieving additional data, according to the analysis performed above.

Figure 2:
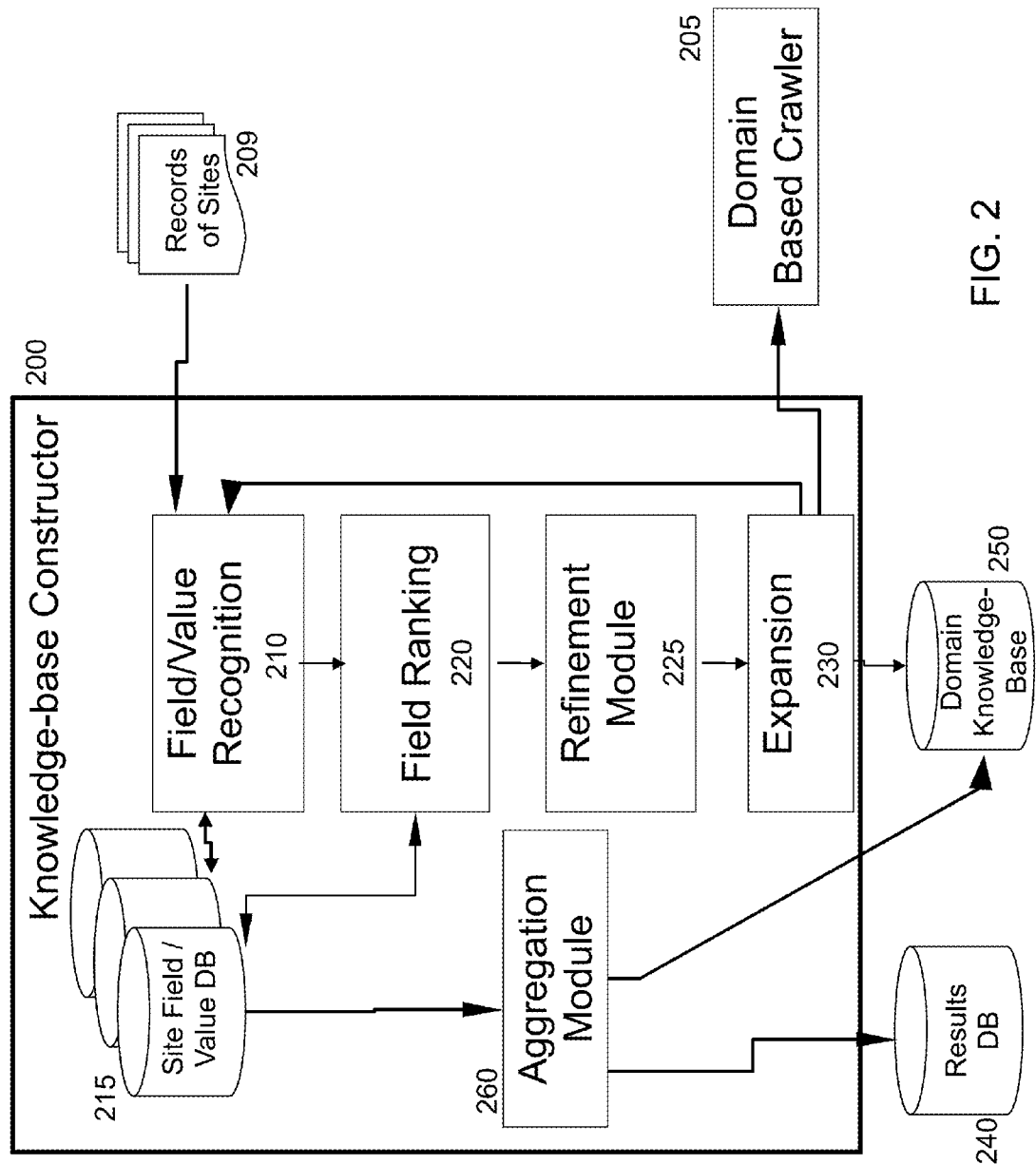
FIG. 2 is a system diagram illustrating an example of a work flow used in creating an automated knowledge base of deep web data sources, according to some embodiments.

Reference is now made to FIG. 2, which describes an implementation of the Knowledge base creation module 200, according to some embodiments. Knowledge base creation module 200 may feature a Field/value Recognition module 210 to identify similar fields that are described in different ways in different sites. Such an identification may allow normalization of substantially same fields from different data sources into one consolidated database. Field/value Recognition module 210, as described previously for Knowledge base creation module 114, recognizes the fields as being fields, according to repeat structure and/or content. Field/value Recognition module 210 then determines the type of values that may be found in such a field.

Knowledge base creation module 200 may further feature a Field Ranking module 220, for identifying ranking of fields based on repetition/usage in the source sites. Greater frequency with which the field appears in a plurality of web sites is one non-limiting example of a parameter which may increase the importance of a field. Another non-limiting example of such a parameter is the connection between a particular field and other fields. Yet another non-limiting example of such a parameter is the content of the field, which may optionally for example be determined to be important.

The Knowledge base creation module 200 may further feature a Refinement module 225, for analyzing the ranked fields to improve machine confidence and accuracy of the operation of Knowledge base creation module 200. Refinement module 225 determines which fields are clearly correctly designated as fields and also determines which fields are clearly not correctly designated (for example terms that do not repeat across many web sites or that do not repeat within a band of statistical confidence). Fields which are clearly not correctly designated as such are preferably removed. Terms which may or may not represent field labels are preferably further analyzed to determine whether they are to be accepted as fields or not.

For example, after understanding similarity of structures in a single site, and subsequently verifying and improving the identification of such structures across multiple sites, the Refinement module 225 can generate greater confidence and accuracy by learning from previous experience in identifying structures, such that when identified and verified structures are seen again, the probability of identification with increasing accuracy increases.

Knowledge base creation module 200 may further feature an Expansion module 230 for preferably expanding the analysis to other web sites for expanding scope and accuracy. Expansion module 230 considers the degree of statistical confidence of the known fields and also how much more information was added in the last iteration. If a statistically significant amount of information was added in the last iteration, expansion module 230 determines how many more web sites should be considered in a new iteration. Alternatively, expansion module 230 may optionally determine that a significant amount of new information was not added in the last iteration and so the iterations may be finished.

According to some embodiments, expansion module 230 can define limits or thresholds at which to start expansion to analyze more new web sites. For example, the module may determine that once a selected confidence level of field identification has been achieved, then a further number if sites may be crawled and processed. On the other hand, if a selected threshold of accuracy has been reached, such that further expansion will not be expected to enhance accuracy substantially, the expansion module may determine that no more expansion be required or executed. Expansion module 230 may be in communication with domain based crawler 205, for new sources from which to add data to the domain knowledge base. Of course, other structures and dimensions, or combinations of elements, may be used.

The above described modules may be used to automatically derive a Domain Knowledge base 250, in accordance with the descriptions above and with reference to FIG. 2.

In an additional phase, domain knowledge base 250 may be used in conjunction with aggregation module 260 to generate a results database 240.

The above described components of the KBCS system 100 may work together to generate automated field-specific knowledge bases, thereby enabling highly accurate delivery of field data and values in accordance with user requests. Further, such knowledge bases may be based on unlimited data sources, whether surface web and/or deep web. Additionally, the system 100 learns and grows in accuracy as the number of sources used to contribute to the knowledge base increases.

In accordance with an example of a work flow used in executing an automated knowledge base configuration of deep web resources, field/value recognition module 210 may optionally identify similar values from field analysis based on multiple field based sources; this module may also additionally optionally refine value certainly based on quantity of sources and by following internal links from sources. Field ranking module 220 may optionally perform ranking to identify ranking of fields based on repetition/usage parameters. Refinement module 225 may optionally grow or develop machine confidence and accuracy based on refining and correcting knowledge base records. Expansion module 230 may optionally expand the scope and accuracy of the knowledge base, by including automated expansion to new sources, and processing/refining of new knowledge base elements. Any steps or combination of the above steps may be implemented. Further, other steps or series of steps may be used.

Figure 3:
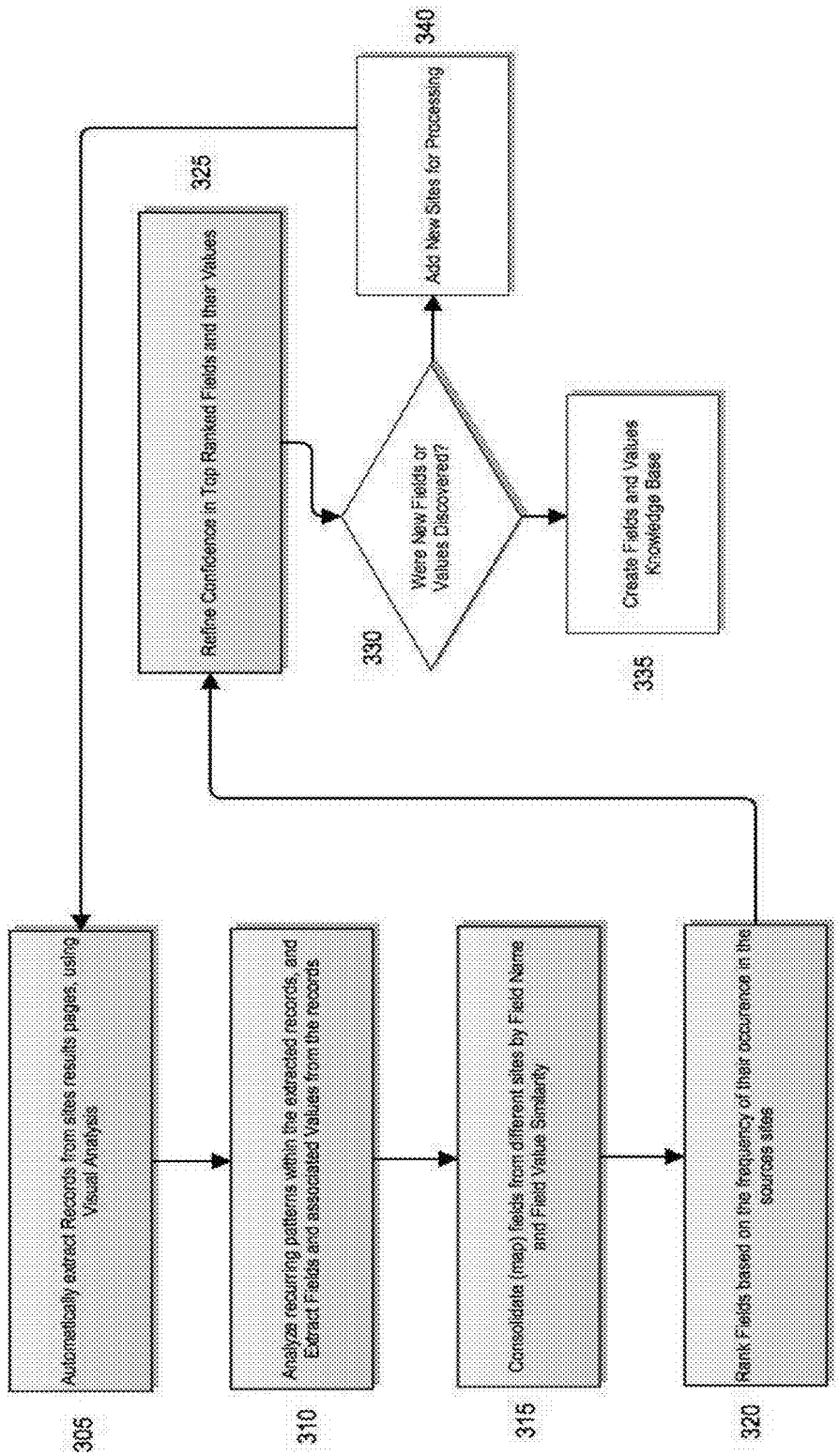
FIG. 3 is a flow chart showing an example of a process in which a Domain Knowledge base is generated, according to one embodiment.

Reference is now made to FIG. 3, which is a flow chart showing an example of a process in which a Domain Knowledge base is generated, according to some embodiments of the present invention. As can be seen in FIG. 3, at stage 305 records may be automatically extracted, using visual, geometric and/or structural analysis, from Websites' results pages or other relevant pages, as previously described (for example optionally by using DOM-trees, also as previously described). At stage 310 fields may be extracted, along with their associated values from the extracted records by analyzing recurring patterns within the extracted records. Again as previously described, such recurring patterns may optionally be analyzed statistically in order to determine the significance of such patterns and/or optionally in order to eliminate patterns that are less important or non-important.

At stage 315 fields may be mapped or consolidated from one or more sites, for example, according to field name and field value similarity. Such mapping enables similar fields having similar content to be grouped together for example, so that synonymous or similar names (or field labels) and/or content may optionally be grouped according to their degree of similarity. At stage 320 fields may be ranked, for example, based on the frequency of their occurrence in the source sites. At stage 325 the system confidence or level of accuracy may be refined, for example relative to top ranked fields and values. At decision stage 330, the Constructor considers or determines whether substantial new fields or values were discovered. If not, then a field and values entries may be added into the knowledgebase, at stage 335. If a substantial number of new fields or values were discovered at stage 330, then at stage 340 new sites may be added for processing, using the expansion step.

According to some embodiments, the system may be used to automatically build field specific knowledge bases without prior knowledge of fields or values associated with the field knowledge bases being built.

According to some embodiments, the system may be used to automatically develop a unified, normalized Database of deep web content from multiple data sources, whether the sources are surface or deep.

According to some embodiments, the system may be substantially language independent, since the visual analyzer enables patterns to be recognized and fields and values to be accurately synchronized and refined in spite of specific languages used in the knowledge base sources.

The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

What is claimed is:

1. A method for automatically generating domain knowledge bases based on deep Web sources, the method being performed by a computer, comprising: training a knowledge base constructor on a plurality of selected web sites according to a domain to detect a plurality of fields defined by said domain; locating a first plurality of deep web sources according to said domain; analyzing said first plurality of deep web sources to detect said plurality of fields by said knowledge base constructor; selecting at least one frequently appearing field for said domain to form a first selected field; creating a first knowledge base for said first plurality of deep web sources; locating a second plurality of deep web sources according to said domain; analyzing said second plurality of deep web sources to detect said plurality of fields by said knowledge base constructor; selecting a second frequently appearing field according to said domain to form a second selected field; creating a second knowledge base for said second plurality of deep web sources; combining said first and second knowledge bases by said knowledge base constructor to form a combined knowledge base; refining said combined knowledge base by:

determining a new frequency of appearance for said first selected field according to frequency in said first and said second plurality of deep web sources;

determining said frequency of appearance for said second selected field according to frequency in said first and said plurality of deep web sources; and performing statistical analysis of said frequency of appearance of said first and second selected fields according to said new frequency of appearance for said first selected field and according to said frequency of appearance for said second selected field to refine said combined knowledge base;

and aggregating content provided by a plurality of deep web sources through at least one selected field according to said combined knowledge base.

2. The method of claim 1, further comprising defining said domain by selecting said plurality of selected web sites fulfilling said domain, each web site having a geometric structure.

3. The method of claim 2, wherein said locating said deep web sources comprising crawling through a plurality of web sites by a crawler; and selecting said deep web sources from said plurality of web sites according to said domain by said crawler.

4. The method of claim 3, wherein said frequently appearing field comprises a field having a statistically weighted number of appearances.

5. The method of claim 3, wherein said frequently appearing field comprises a field having a statistically significant number of appearances.

6. The method of claim 1, further comprising repeating the method from said locating said first plurality of deep web sources through said refining said knowledge base for at least one additional plurality of deep web sources.

7. The method of claim 1, wherein said analyzing said first plurality of deep web sources and said analyzing said second plurality of deep web sources comprises deconstructing said deep web sources by a geometric analyzer to form deconstructed deep web sources; and analyzing said deconstructed deep web sources by said knowledge base constructor.

8. The method of claim 7, wherein said analyzing said first plurality of deep web sources and said analyzing said second plurality of deep web sources further comprises determining equivalent terms in said fields; and collapsing said equivalent terms to a single selected term for being stored in said knowledge base.

9. The method of claim 8, wherein said refining said combined knowledge base further comprises determining a content of said fields and refining said combined knowledge base according to said content of said fields.

10. The method of claim 9, wherein said repeating the method from said locating said first plurality of deep web sources through said refining said knowledge base for at least one additional plurality of deep web sources further comprises determining when to repeat the method according to one or more of time and expansion of said deep web sources.

11. The method of claim 10, wherein said determining when to repeat the method according to one or more of time and expansion of said deep web sources further comprises periodically analyzing an additional plurality of deep web sources.

* * * * *